United States Patent [19]

Iida et al.

[11] Patent Number: 5,472,635
[45] Date of Patent: Dec. 5, 1995

[54] PHASE PLATE AND LIQUID CRYSTAL DISPLAY USING SAME

[75] Inventors: Shigeki Iida, Kawasaki; Takehiro Toyooka; Hiroyuki Itoh, both of Yokohama; Yasuyuki Takiguchi, Kawasaki; Akihiko Kanemoto; Haruo Iimura, both of Yokohama, all of Japan

[73] Assignees: Nippon Oil Company, Ltd.; Ricoh Company, Ltd., both of Tokyo, Japan

[21] Appl. No.: 218,690

[22] Filed: Mar. 28, 1994

Related U.S. Application Data

[63] Continuation of Ser. No. 991,511, Dec. 17, 1992, abandoned, which is a continuation of Ser. No. 681,951, Apr. 8, 1991, abandoned.

[30] Foreign Application Priority Data

Apr. 10, 1990 [JP] Japan .................................. 2-93170
Apr. 19, 1990 [JP] Japan .................................. 2-104507

[51] Int. Cl.⁶ .......................... C09K 19/52; C09K 19/56; G02F 1/13
[52] U.S. Cl. .................. 252/299.01; 252/299.4; 359/73
[58] Field of Search ............... 252/299.01, 299.4; 359/73

[56] References Cited

U.S. PATENT DOCUMENTS

| | | | |
|---|---|---|---|
| 4,293,435 | 10/1981 | Portugall et al. | 252/299.01 |
| 4,702,558 | 10/1987 | Coles et al. | 350/330 |
| 4,985,285 | 1/1991 | Ichikawa et al. | 428/1 |
| 5,206,752 | 4/1993 | Itoh et al. | 359/106 |
| 5,250,214 | 10/1993 | Kanemoto et al. | 252/299.01 |
| 5,260,109 | 11/1993 | Iida et al. | 428/1 |
| 5,308,535 | 5/1994 | Scheuble et al. | 252/299.01 |

FOREIGN PATENT DOCUMENTS

1206318 8/1989 Japan.

*Primary Examiner*—Gary L. Geist
*Assistant Examiner*—Cynthia Harris
*Attorney, Agent, or Firm*—Scully, Scott, Murphy & Presser

[57] ABSTRACT

Provided is a phase plate comprising a light transmitting base, an alignment layer formed on said base, and a film formed on said alignment layer by a liquid crystalline polymer which exhibits a nematic orientation in the state of liquid crystal and assumes a glassy state at a temperature below the liquid crystal transition point of the polymer.

2 Claims, 6 Drawing Sheets

PHASE PLATE AND LIQUID CRYSTAL DISPLAY USING SAME

This is a continuation of application Ser. No. 07/991,511, filed on Dec. 17, 1992, now abandoned which is a file wrapper continuation of Ser. No. 681,951, filed on Apr. 8, 1991, now abandoned.

BACKGROUND OF THE INVENTION

The present invention relates to an optical phase plate and a liquid crystal display using same.

Recently, in the optical field and the optoelectronics field, a phase plate for controlling the phase of light has become one of important optical elements. For example, it is utilized as a ½ wavelength plate, a ¼ wavelength plate, or a compensator for liquid crystal display. Particularly, in the field of liquid crystal display (LCD), the phase plate is now an essential optical element for improving the display quality. Above all, a super twisted nematic (STN) liquid crystal display is of a multiplex driven dot-matrix type which permits a large-screen display, and as compared with the conventional twisted nematic (TN) type liquid crystal display, the STN liquid crystal display is characteristic in that the contrast is high and the field angle is wide. Because of these characteristics the STN liquid crystal display is widely used in the field of liquid crystal display which requires a large-screen display such as, for example, personal computers, word processors and various data terminals. However, the STN type basically cannot make display in a black-and-white mode and it is unavoidable that the display is in green to yellowish red in the absence of voltage and in blue in the presence of voltage. Such a colored mode display is not only undesirable to the users but also involves a serious drawback of being unable to cope with coloring of a display unit. Various proposals have been made for eliminating this drawback. According to a typical method, a phase difference created when light passes through a liquid crystal display is compensated for to realize a black-and-white display, using an optical phase film which is a uni- or biaxially stretched polymeric film such as polycarbonate or polyvinyl alcohol film. In the production of such phase film for STN-LCD, however, it is necessary to obtain a film having a value of highly uniform retardation (birefringence X film thickness) over a large area, but this is extremely difficult industrially. Poor yield and high cost will result.

In the case of the above stretched film there also arises the problem of deteriorated contrast due to the fact that the dependence of the compensator birefringence upon wavelength is smaller than that of the liquid crystal birefringence. This is because at a certain specific wavelength the compensation is effected completely, while at another wavelength the compensation is incomplete, thus causing the decrease of dark level.

Also in such optical elements as ½ wavelength plate and ¼ wavelength plate, it is difficult to control their phase difference accurately, and high cost will result.

It is an object of the present invention to overcome the above-mentioned problems of the prior art.

It is another object of the present invention to provide a phase plate easy to be manufactured and capable of controlling the phase difference thereof accurately.

It is a further object of the present invention to provide a liquid crystal display capable of making a black-and-white display at a wide field angle and a high contrast.

SUMMARY OF THE INVENTION

The phase plate according to the present invention comprises a light transmitting base, an alignment layer formed on the base, and a film formed on the alignment layer by a liquid crystalline polymer which exhibits a nematic orientation in the state of liquid crystal and assumes a glassy state at a temperature below the liquid crystal transition point of the polymer.

The liquid crystal display according to the present invention comprises a liquid crystal cell including a pair of bases having electrodes and a liquid crystal layer sandwiched in between the said bases and having a positive dielectric anisotropy, the liquid crystal layer being twist-oriented substantially horizontally in the absence of voltage and with a spiral axis facing perpendicularly to the bases; polarizers disposed outside the bases; and a compensator disposed between the liquid crystal cell and a polarizer, the said compensator being formed by the aforementioned phase plate.

DETAILED DESCRIPTION OF THE INVENTION

The present invention will be described in detail hereinunder.

The phase plate of the present invention is fabricated by heat-treating on an alignment layer a liquid crystalline polymer which exhibits a uniform nematic orientation of monodomain and which permits the state of such orientation to be immobilized easily, to form a uniform nematic structure of monodomain, followed by cooling to immobilize the oriented state without impairing the orientation in the state of liquid crystal.

The liquid crystalline polymer used in the present invention exhibits a uniform nematic orientation of monodomain and permits such oriented state to be immobilized easily. It is essential for the said liquid crystalline polymer to have the following property. For stable immobilization of the nematic orientation, when viewed from the phase sequence of liquid crystal, it is important that there be no crystal phase in the portion lower in temperature than the nematic phase. If such crystal phase is present, cooling for immobilization proceeds inevitably through the said crystal phase, resulting in breakage of the nematic phase once obtained. Therefore, the liquid crystalline polymer used for the purpose in question is required as an essential condition to have not only good orientatability based on an lower in temperature than the nematic phase.

As to the kind of the liquid crystalline polymer to be used, there may be used any such polymer which exhibits nematic orientation in the state of liquid crystal and assumes the state of glass at temperatures below the liquid crystal transition point thereof. Examples are main chain type liquid crystalline polymers such as polyesters, polyamides, polycarbonates, and polyester imides, as well as side chain type liquid crystalline polymers such as polyacrylates, polymethacrylates, polymalonates, and polysiloxanes. Particularly, polyesters are preferred in point of easy preparation, good orientation and high glass transition point. Polyesters containing an ortho-substituted aromatic unit as are most preferred. Polymers containing as a repeating unit an aromatic unit having a bulky substituent group in place of an ortho-substituted aromatic unit or an aromatic unit having fluorine or a fluorine-containing substituent group, are also employable. The "ortho-substituted aromatic unit" as referred to herein means a structural unit with main chain-constituting bonds ortho to each other. Examples are the following catechol, salicylic acid and phthalic acid units as well as substituted derivatives thereof:

wherein X represents hydrogen, halogen, e.g. Cl or Br, an alkyl or alkoxy group having 1 to 4 carbon atoms, or phenyl, and k is 0 to 2.

The following are particularly preferred:

(Me: methyl Et: ethyl
Bu: butyl)

Also, as examples of the polyester used in the present invention there are mentioned those containing as repeating units (a) a structural unit (hereinafter referred to as "diol component") derived from a diol and a structural unit ("dicarboxylic acid component" hereinafter) derived from a dicarboxylic acid and/or (b) a structural unit ("hydroxycarboxylic acid component" hereinafter) derived from a hydroxycarboxylic acid containing both carboxyl and hydroxyl groups in one unit. Preferably, these polyesters further contain the foregoing ortho-substituted aromatic unit.

As examples of the diol component there are mentioned the following aromatic and aliphatic diols:

wherein Y represents hydrogen, halogen, e.g. Cl or Br, an alkyl or alkoxy group having 1 to 4 carbon atoms, or phenyl, and l is 0 to 2, wherein Z represents hydrogen, halogen, e.g. Cl or Br, an alkyl or alkoxy group having 1 to 4 carbon atoms, or phenyl, and m is 0 to 2, Particularly, the following are preferred:

Particularly, the following are preferred:

As examples of the dicarboxylic acid component, the following may be mentioned:

-continued

As examples of the hydroxycarboxylic acid component, the following units may be mentioned:

The dicarboxylic acid to diol mole ratio is approximately 1:1 like that of polyesters commonly used (carboxyl to hydroxyl ratio in the case of using a hydroxycarboxylic acid). The proportion of ortho-substituted aromatic units in the polyester is preferably in the range of 5 to 40 mole %, m. more preferably 10 to 30 more %. In the case where the said proportion is smaller than 5 mole %, a crystal phase tends to appear under the nematic phase, so such proportion is not desirable. A proportion larger than 40 mole % is not desirable, either, because the polymer will no longer exhibit liquid crystallinity. The following are typical examples of polyesters which may be used in the present invention:

polymers consisting essentially of the following structural units:

Polymer consisting essentially of the following structural units:

polymers consisting essentially of the following structural units:

polymers consisting essentially of the following structural units:

polymers consisting essentially of the following structural units:

polymers consisting essentially of the following structural units:

polymer consisting essentially of the following structural units:

-continued polymers consisting essentially of the following structural units:

Also preferred are polymers which, in place of ortho-substituted aromatic units, contain as repeating units such bulky substituent-containing aromatic units or aromatic units containing fluorine or fluorine-containing substituents as shown below:

-continued

The proportion of the above bulky substituent-containing aromatic units or aromatic units containing fluorine or fluorine-containing substituents in the polyester is usually in the range of 5 to 40 mole %.

The polyesters exemplified above range in molecular weight preferably from 0.05 to 3.0, more preferably 0.07 to 2.0, in terms of inherent viscosity as determined at 30° C. in a solvent, e.g. a mixed phenol/tetrachloroethane (60/40) solvent. An inherent viscosity lower than 0.05 is not desirable because the strength of the resulting film of high molecular liquid crystal will be low, while if the inherent viscosity is higher than 3.0, there will arise such problems as the deterioration of orientatability and an increase of the time required for orientation because of too high viscosity during the formation of liquid crystal. The glass transition points of these polyesters are also important, exerting influence on the stability of orientation after the immobilization thereof. Assuming that the working temperature is room temperature or thereabouts, though it also depends on the use, it is desirable that the glass transition points of the polyesters be not lower than 30° C., more preferably not lower than 50° C. In the case of a glass transition point lower than 30° C., the use of the phase difference plate at room temperature or thereabouts may cause a change of the liquid crystal structure once immobilized, thus resulting in the deterioration of a function based on the liquid crystal structure. Therefore, such low glass transition point is not desirable.

How to prepare the polyester used in the present invention is not specially limited. There may be adopted any of the polymerization processes known in this field, e.g. a melt polymerization process or an acid chloride process using an acid chloride of a corresponding dicarboxylic acid.

According to a melt polycondensation process, the polyester can be prepared by polymerizing a corresponding dicarboxylic acid and an acetylated compound of a corresponding diol at a high temperature and in a high vacuum. The molecular weight thereof can be adjusted easily by controlling the polymerization time or the feed composition. For accelerating the polymerization reaction there may be used a known metal salt such as sodium acetate. In the case of using a solution polymerization process, the polyester can be prepared easily by dissolving predetermined amounts of a dicarboxylic acid dichloride and a diol in a solvent and heating the resulting solution in the presence of an acid acceptor such as pyridine.

The phase plate according to the present invention basically has a three-layer structure comprising a light transmitting base, an alignment layer formed on the light transmitting base, and a liquid crystalline polymer film formed on the alignment layer. As the light transmitting base there may be used for example, glass or a light transmitting plastic plate, film or sheet. As to the plastic base, it is desirable for it to be isotropic optically. Examples of such plastics include polymethyl methacrylates, polystyrenes, polycarbonates, polyether sulfones, polyphenylene sulfides, polyolefins, and epoxy resins. On the base is formed an alignment layer for orienting a liquid crystalline polymer horizontally with respect to the base and in a specific direction. Suitable examples of the alignment layer are polyimide films which have been subjected to a rubbing treatment. The alignment films known in this field such as an obliquely vapor deposited film of silicon dioxide and a rubbing-treated film of polyvinyl alcohol are also employable. By forming a liquid crystalline polymer film on the alignment layer thus formed on the light transmitting base there is obtained the phase plate of the present invention.

First, the liquid crystalline polymer used in the invention is dissolved in a predetermined solvent at a predetermined concentration to prepare a solution. In this case, the solvent to be used differs depending on the kind of the polymer used, but usually there may be used, for example, any of halogenated hydrocarbons such as chloroform, dichloroethane, tetrachloroethane, trichloroethylene, tetrachloroethylene, and o-dichlorobenzene, mixed solvents thereof with phenol, dimethylformamide, dimethylacetamide, and dimethyl sulfoxide. The concentration of the solution greatly differs depending on the viscosity of the polymer used, but usually it is in the range of 5% to 50%, preferably 10% to 30%. The solution is then applied onto a light transmitting glass sheet, plastic sheet or plastic film which has been subjected to an orientation treatment. The orientation treatment may be performed by any method if only the liquid crystal molecules are oriented in parallel with the interface. A suitable example is a glass sheet or film which has been subjected to a rubbing treatment after the application of polyimide thereto. As the application method of the solution there may be adopted, for example, spin coating method, roll coating method, printing method, or dipping/pulling-up method. After the application of the solution, the solvent is removed by drying and a heat treatment is performed at a predetermined temperature for a predetermined time to complete a nematic orientation of monodomain. For promoting the orientation based on an interfacial effect, the lower the polymer viscosity, the better. It follows that the higher the temperature, the better. But a too high temperature is not desirable because it would cause an increase of cost and deterioration of the working efficiency. Further, since some polymers have an isotropic phase in a higher temperature region than the nematic phase, orientation will not be obtained even if heat treatment is performed in that temperature region. Thus, it is desirable to perform the heat treatment at a temperature above the glass transition point of the polymer used and below the point of transition to an isotropic phase, in accordance with the characteristics of the polymer. A suitable temperature range is from 50° to 300° C., more preferably 100° to 250° C. The time required for attaining a satisfactory orientation in the state of liquid crystal on the alignment layer differs depending on the polymer composition and molecular weight, but preferably it is in the range of 10 second to 60 minutes, more preferably 30 seconds to 30 minutes. If the said time is shorter than 10 seconds, the orientation will be unsatisfactory, and if it is longer than 60 minutes, the productivity will become lower.

The same state of orientation can be obtained also by applying the polymer in a melted condition onto the base which has been subjected to the orientation treatment and thereafter heat-treating the polymer. By performing these treatments using the liquid crystalline polymer in the invention there can be obtained a nematic orientation which is uniform throughout the whole surface on the alignment layer in the state of liquid crystal. By subsequent cooling to a temperature below the glass transition point of the liquid crystalline polymer, the oriented state thus obtained can be immobilized without impairing the orientation. Generally, in the case of using a polymer having a crystal phase in a lower temperature region than the liquid crystal phase, the orientation in the state of liquid crystal will be destroyed by cooling. According to the process of the present invention, such phenomenon will not occur because the polymeric system used therein has a glass phase under the liquid crystal phase, and it is possible to immobilize the nematic orientation completely. The cooling speed is not specially limited. The orientation can be immobilized by merely exposing the polymer into an atmosphere held at a temperature below the glass transition point of the polymer out of the heating atmosphere. For enhancing the production efficiency there may be adopted a forced cooling such as air-cooling or water-cooling. The film thickness after the immobilization is preferably up to 100 μm, more preferably up to 50 μm. If the film thickness exceeds 100 μm, the effect of the oriented film will be deteriorated, so that it becomes difficult to obtain uniform orientation.

Thus, a high degree of orientation control and immobilization of the orientation can be effected by contacting only one side of the polymer film with the alignment layer while allowing the other side thereof to be free, for example keeping it in contact with air. Generally, the orientation control for liquid crystal is performed by contacting both interfaces with the alignment layer, and when one side is in contact with air, the molecular orientation at the air interface is not uniform, thus making it impossible to obtain uniform orientation throughout the whole area in the film thickness direction. In the present invention, by controlling only one side there can be attained a nematic orientation of monodomain and this orientation can be immobilized. This is an outstanding feature of the present invention.

The phase plate thus obtained may be used as it is, or a protective layer of a transparent plastic material may be formed thereon for the protection of the film surface. Also, it may be used in combination with another optical element such as a polarizer. The phase plate produced by the process of the present invention as described above is suitable as such an optical element as ½ wavelength plate or ¼ wavelength plate and is also suitable as an optical element for liquid crystal display. Particularly, it is suitable as a color compensator for STN liquid crystal display. The phase plate of the invention not only permits a high grade black-and-white display but also is of extremely great industrial value because of low manufacturing cost and high productivity.

Figure 1:
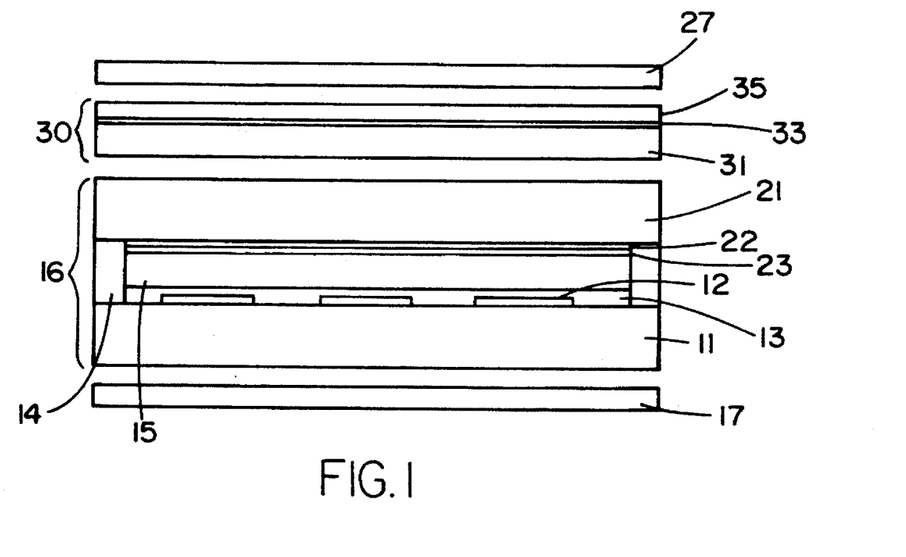
FIGS. 1, 5, 7 and 9 are each a sectional view showing an example of construction of a liquid crystal display according to the present invention.

An example of a liquid crystal display fabricated according to the present invention, using the above phase plate, will now be described. FIG. 1 is a sectional view showing an example of construction of such liquid crystal display. In this liquid crystal display, a first light transmitting base 11 and a second light transmitting base 21 are disposed in spaced and opposed relation to each other, and liquid crystal is sealed into a space formed by both bases 11, 21 and an outer peripheral seal 14 to form a liquid crystal layer 15. In this way a liquid crystal cell 16 is formed. On the inner surfaces of the bases 11 and 21 there are formed transparent electrodes 12 and 22 for the application of voltage to the liquid crystal layer 15 and also formed alignment layers 13 and 23 for orientating the transparent electrodes 12, 22 and the liquid crystal in a certain direction. Numerals 17 and 27 denote polarizers. Between the liquid crystal cell 16 and the polarizer 27 there is disposed a compensator 30 constituted by the foregoing phase plate and containing a liquid crystalline polymer 35 as a main component. Numeral 31 represents the foregoing light transmitting base such as glass sheet on which is formed the liquid crystalline polymer film through an alignment layer.

Figure 2:
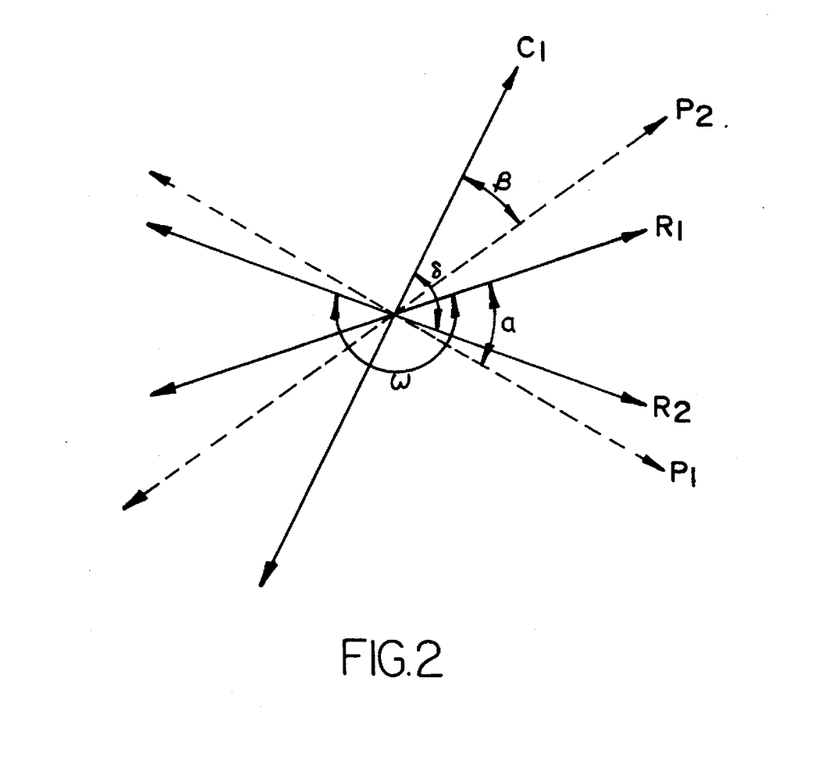
FIGS. 2, 6, 8 and 10 are each a showing an angular relation of components of the liquid crystal display in which FIGS. 2, 6, 8 and 10 correspond to FIGS. 1, 5, 7 and 9, respectively.

The liquid crystal in the liquid crystal layer 15 is a nematic or cholesteric liquid crystal having a positive dielectric anisotropy and is orientated substantially in parallel with the base surfaces in the absence of voltage by the alignment layers 13 and 23. It is preferable that the liquid crystal be in a twist-oriented state with a spiral axis facing perpendicularly to the base surfaces between the upper and lower bases, and that the twist angle be in the range of 120° to 360°. If the twist angle is smaller, the sharpness of the voltage-transmissivity characteristic will be deteriorated, thus leading to deterioration of the time division drive characteristic. As shown in FIG. 2, the twist angle ω of the liquid crystal can be controlled easily by controlling an orientation treatment direction ($R_1$) of the alignment layer 13 on the lower base 11, an orientation treatment direction ($R_2$) of the alignment layer 23 on the upper base 21, the liquid crystal pitch and the thickness of the liquid crystal layer 15. The retardation $R_L$(rad) of the twist-oriented liquid crystal layer 15 at a wavelength λ is expressed as follows using the product $\Delta n_L d_L$ of a refractive anisotropy $\Delta n_L$ of the liquid crystal and the thickness $d_L$ of the liquid crystal layer 15 and also using a twist angle $\omega_L$(rad):

$$R_L = (\omega L^2 + \pi^2 (\Delta n_L d_L/\lambda)^2)^{1/2} \qquad (1)$$

For obtaining good contrast, it is preferable that $R_L$ be in the range of π to 3π, more preferably 1.5π to 2.5π, at λ=550 nm. It is preferably in the range of 0.4 μm to 13 μm in terms of Δnd though it differs depending on the twist angle.

As described previously, the compensator 30 is basically constituted by the liquid crystalline polymer 35 with orientation immobilized and the light transmitting base 31 which is for holding the liquid crystalline polymer. The orientation of the liquid crystalline polymer is controlled so as to be a homogeneous orientation in this layer. In this construction, the liquid crystalline polymer layer creates birefringence due to its optical anisotropy. The retardation $R_c$ of the liquid crystalline polymer layer is expressed as follows using the refractive anisotropy $\Delta n_c$ of the liquid crystalline polymer and the thickness $d_c$ of the liquid crystalline polymer layer:

$$R_c = \pi \Delta n_c d_c / 2 \qquad (2)$$

Light which has passed through the polarizer 17 and entered the liquid crystal layer 15 in linear polarization passes through the layer 15, whereby such a phase deviation as expressed by the equation (1) is developed between ordinary and extra-ordinary rays. As a result, the light which has passed through the liquid crystal layer 15 becomes an elliptically polarized light having allipticity and azimuth which differ depending on the wavelength. The compensator 30 used in the present invention functions to restore this elliptic polarized light again to a linearly polarized light or an elliptically polarized light having a large ellipticity and a small wavelength dependence of azimuth. More particularly, a white background is obtained by disposing a transmission axis of the polarizer 27 in parallel with the azimuth direction of the (elliptically) polarized light, while a black background is obtained by disposing it orthogonally.

In order to obtain a good black-and-white display, it is desirable to set $R_c$ equal to $R_L$ or smaller than $R_L$ by an integer multiple of about ½π. When wavelength is represented by 550 nm corresponding to the highest luminosity, it is preferable that $\Delta n_c d_c$ be in the =range of 0.25 to 0.9 μm.

Although in this example the compensator 30 is provided between the based 21 and the polarizer 27, the position of the compensator is not specially limited if only it is between the liquid crystal layer 15 and the polarizer 17 or 27. Also, plural compensators can be used. In this case, it is preferable that the retardation in a laminated state of the compensators be within the foregoing range.

The compensator used in the present invention utilizes the birefringence of the oriented liquid crystalline polymer, and for attaining a uniform display it is necessary that the orientation of the liquid crystalline polymer be a homogeneous orientation. Such a homogeneous orientation can be attained by performing an orientation treatment of the liquid crystalline polymer having both nematic phase and glass phase in the phase sequence thereof.

In the display unit of the present invention it is particularly preferred that the liquid crystalline polymer be orientated in the state of liquid crystal, then cooled to a temperature below the glass transition point thereof to immobilize the orientation in the liquid crystal state and thereafter used. By so doing, the self-holding property of the liquid crystalline polymer can be utilized; that is, the provision of opposed bases for holding the liquid crystalline polymer can be omitted and there can be used a single base. Further, because of a solid phase at the working temperature, there is no change in thickness or in retardation and so it is possible to attain a high reliability. For immobilizing the namatic orientation stably, it is necessary for the liquid crystalline polymer to have no crystal phase on a lower temperature side than the nematic phase in the phase sequence of the polymer. It is desirable that there be no smectic phase. These phases if present would inevitably be affected at the time of cooling for immobilization, resulting in the uniform nematic orientation once obtained being disturbed or destroyed.

For the purpose of protecting the surface of the liquid crystalline polymer, another base may be laminated to the compensator used in the invention. Also, for the same purpose, another resin film may be formed on the surface of the compensator.

As described previously, the compensator is basically of a three-layer structure comprising the light transmitting base 31, the alignment layer 33 provided between the base and the liquid crystalline polymer film for orientating the liquid crystalline polymer, and the liquid crystalline polymer film. Generally, the base is provided separately from the liquid crystal cell or the polarizer, as shown in FIG. 1, but the liquid crystal cell or the polarizer itself may be used as the base.

Figure 3:
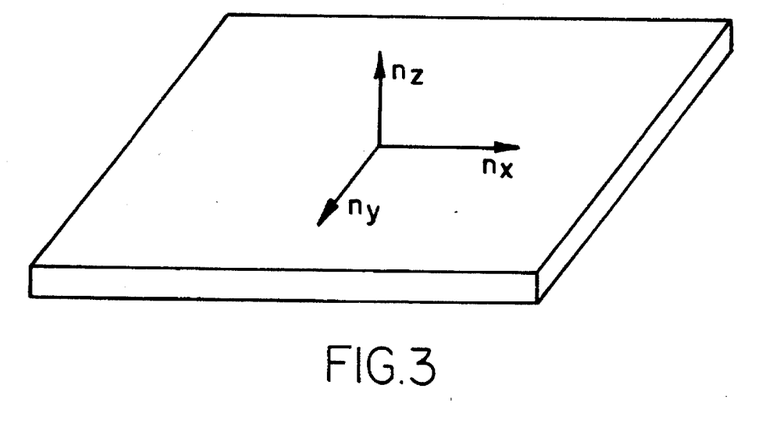
FIG. 3 is a definition diagram of refractive index directions of a phase plate.
Figure 4:
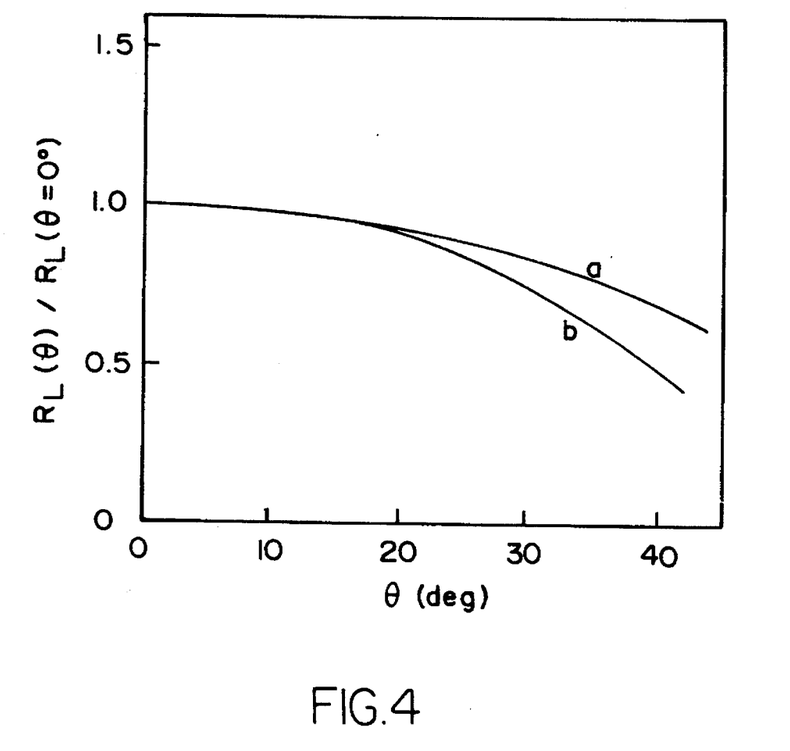
FIG. 4 is a diagram showing a field angle dependence of retardation.

The liquid crystal display according to the present invention is characterized by having a wide field angle. As shown in FIG. 3, the refractive index of a phase plate can be represented by an intra-plane refractive x indices $n_x$, $n_y$ ($n_x > n_y$) and a refractive index $n_z$ in the thickness direction. In general stretched films, these refractive indices are in the relation of $n_x > n_y > n_z$. In such a phase plate, the visual angle dependence of retardation is large, so when used as a compensator in an STN type liquid crystal display, there arise such problems as coloration and deteriorated contrast. On the other hand, in the compensator used in the present invention, since there is used an orientated liquid crystalline polymer, the relation of refractive indices is $n_x > n_y = n_z$ and thus it is possible to greatly reduce the visual angle dependence of retardation. i.e., the visual angle dependence of the liquid crystal display. In FIG. 4, the dependence on visual angle θ (θ represents an angle of inclination from the normal line of the compensator toward $n_x$) of retardation $R_c$ of the compensator used in the invention is assumed to be a and is compared with that b in the case of a stretched polycarbonate film. As illustrated therein, an excellent effect of reducing the visual angle dependence in the present invention was confirmed.

A highly uniform display derived from the uniformity of the compensator is another characteristic feature of the liquid crystal display of the present invention. In the present invention, as mentioned above, since a homogeneous orientation in the nematic phase is immobilized, it is possible to fabricate the compensator in an extremely uniform manner and hence the display unit can provide a uniform display.

As a still further feature of the liquid crystal display of the present invention there is mentioned a high contrast. Generally, in the case of a stretched polymer film used as a phase plate, the wavelength dependence of retardation is smaller than that of liquid crystal, so even if good compensation is performed at some wavelength, it is incomplete at another wavelength. For example, in a normally black display which is black in the absence of voltage, there occurs drop-out of light at some particular wavelength, resulting in deteriorated contrast. But in the present invention such a problem does not arise because the liquid crystal layer and the compensator are almost the same in the wavelength dependence of retardation.

As a feature of the compensator used in the present invention there is mentioned optionality of retardation control. In the case of a conventional compensator using a stretched film, the control of retardation can be made by controlling the film thickness and the stretch ratio. However, it is very difficult to stretch film uniformly, and only under very restricted fabrication conditions there is obtained a uniform phase plate. Actually, therefore, it is unreal industrially to fabricate a phase plate having an optional retardation. In the present invention, the control of retardation can be done easily by changing the thickness of the liquid crystalline polymer film, so it is possible to easily fabricate a compensator for any liquid crystal cell.

A still further feature of the liquid crystal display of the present invention is a high reliability. In the case where the compensator used in the invention is used after the immobilization of orientation, the state of orientation is not changed by external forces or temperatures if only the temperature is below the temperature at which there occurs the transition to a liquid crystal phase of the liquid crystalline polymer, so there is attained a high reliability.

In the angular arrangement illustrated in FIG. 2, $C_1$ indicates an orientation treatment direction in an alignment layer for orientating the liquid crystalline polymer. The liquid crystalline polymer is orientated homogeneously in the direction of $R_3$. For attaining a good compensation effect, it is preferable the the angle between $C_1$ and $R_2$ be in the range of 40° to 140°, more preferably 60° to 120°. $P_1$ and $P_2$ represent polarized light transmission axes (or absorption axes) of the polarizers 17 and 27, respectively. For the same purpose, it is preferable that the angle α between $P_1$ and $R_1$ be in the range of 20° to 70° and that the angle between $C_1$ and $P_2$ be also in the range of 20° to 70°.

Figure 5:
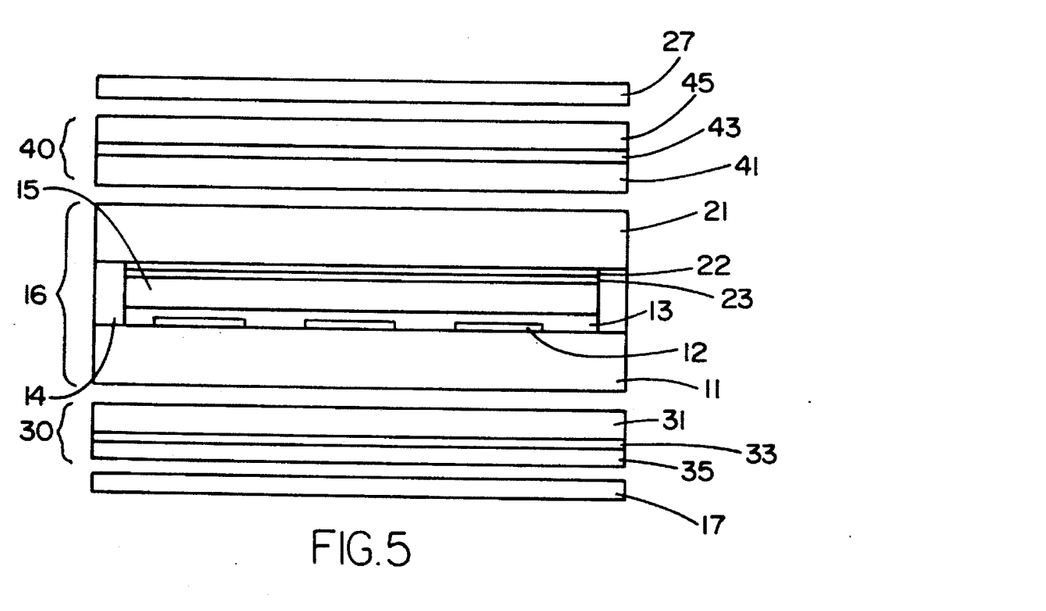
Figure 6:
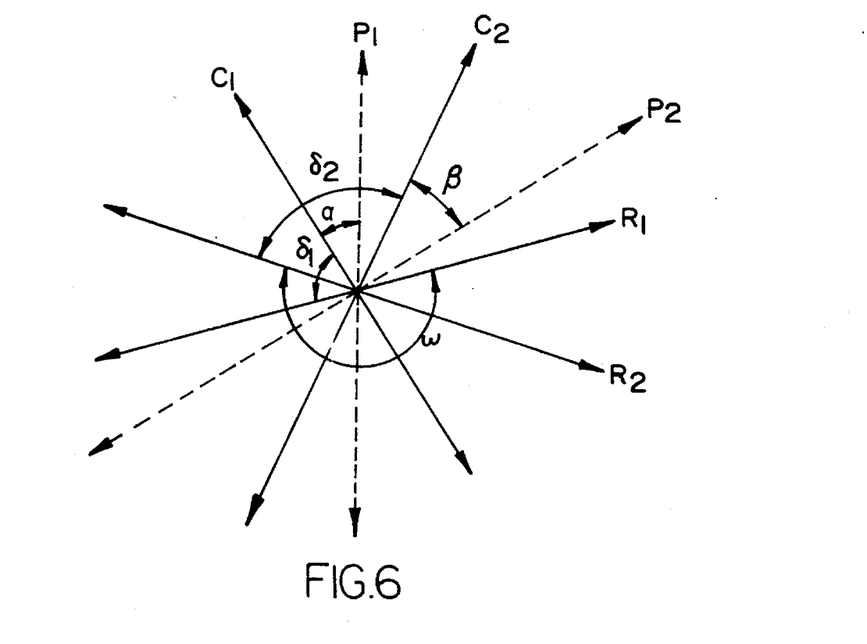

FIG. 5 shows another example of construction in which compensators 30 and 40 both formed by the liquid crystalline polymer are disposed on both sides of a liquid crystal cell 16. Although this construction is more complicated than the construction illustrated in FIG. 1, the contrast can be made higher. FIG. 6 illustrates an angular arrangement in the construction of FIG. 5, in which the orientation direction of the liquid crystalline polymer film provided between a polarizer 17 and a base 11 is indicated by $C_1$, the orientation direction of the liquid crystalline polymer provided between a polarizer 27 and a base 21 is indicated by $C_2$, the angle of intersection between $C_1$ and $R_1$ is indicated by $\delta_1$, and the angle of intersection between $C_2$ and $R_2$ is indicated by $\delta_2$. Further, the angle of intersection between $P_1$ and $C_1$ and that between $P_2$ and $C_2$ are represented by $\alpha$ and $\beta$, respectively. Preferably, $\delta_1$ and $\delta_2$ are in the range of 40° to 140°, more preferably 60° to 120°.

Examples

Working examples of the present invention and comparative examples will be described below, but it is to be understood that the invention is not limited to those working examples. The following analytical methods were used in the examples.

(1) Determination of Polymer Composition

Polymer was dissolved in deuterated chloroform or deuterated trifluoroacetic acid and determined for composition by means of 400 $MH_z$ $^1$H-NMR (JNM-GX400, a product of Japan Electron Optics Laboratory Co., Ltd.).

(2) Determination of Inherent Viscosity

Determined at 30° C. in a mixed phenol/tetrachloroethane (60/40 weight ratio) solvent, using a Ubbelohde's viscometer.

(3) DSC Determination

Determined using Dupont 990 Thermal Analyzer.

(4) Observation with Optical Microscope

Observed using a polarizing microscope $BH_2$ (a product of Olympus Optical Co., Ltd.).

Example 1

Using 50 mmol of terephthalic acid, 25 mmol of methylhydroquinone diacetate, 25 mmol of catechol diacetate and 100 mg of sodium acetate, polymerization was performed in a nitrogen atmosphere while the temperature was raised stepwise at 100° C. for 30 minutes, 130° C. for 30 minutes, 150° C. for 1 hour, 200° C. for 1 hour and 250° C. for 1 hour. Then, under a nitrogen gas stream the polymerization was continued at 250° C. for 2 hours and further conducted for 1 hour at the same temperature under reduced pressure. The resulting polymer was dissolved in tetrachloroethane, followed by filtration and subsequent reprecipitation with methanol to afford 9.0 g of purified polymer having the properties shown in Table 1.

There was prepared a 15 wt % tetrachloroethane solution containing this polymer. Then, this solution was applied by a spin coating method onto a 12 cm by 12 cm glass plate (a product of EHC Co. ) having on one side thereof an alignment film of polyimide which had been subjected to a rubbing treatment, and thereafter dried.

Next, this sample was heat-treated in an air constant-temperature bath at 200° C. for 10 minutes, then taken out from the bath and allowed to cool for immobilization. The film thus obtained on the glass was a completely transparent and smooth film having a thickness of 1.1 μm. The state of orientation of this film was observed under a crossed nicol of a polarizing microscope; as a result, no defects were observed throughout the whole area. Next, this film was subjected to polarization analysis and thereby determined for retardation ($\Delta n.d$ where $\Delta n$ represents birefringence and d represents the film thickness) which was 0.25 μm (630 nm). It turned out that a nematic structure was immobilized.

Example 2

Using the polymer described in Example 1, it was cast onto a glass plate having a rubbing-treated polyimide layer with a size of 5 cm×10 cm and a thickness of 0.1 cm, by means of a screen printer; and then dried. Therafter, heat treatment and immobilization were performed unde the same conditions as in Example 1 to obtain a phase film for color compensation 2.6 μm in thickness with a nematic structure immobilized.

Figure 7:
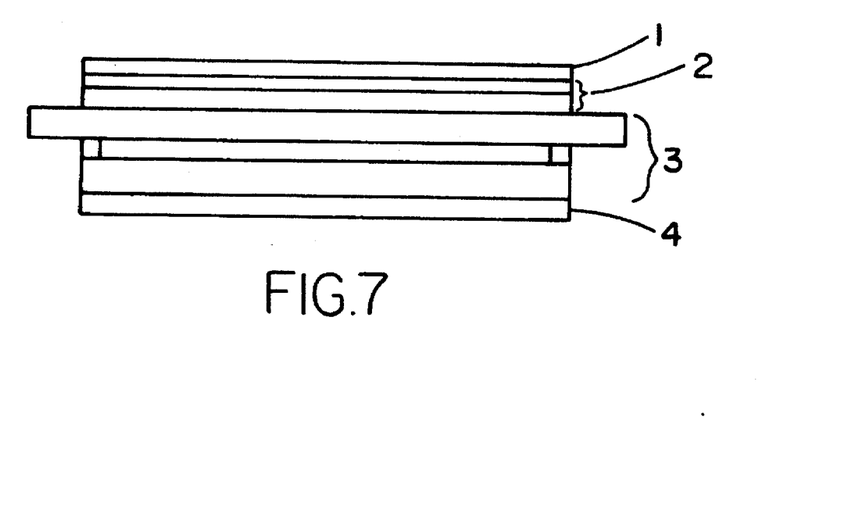
Figure 8:
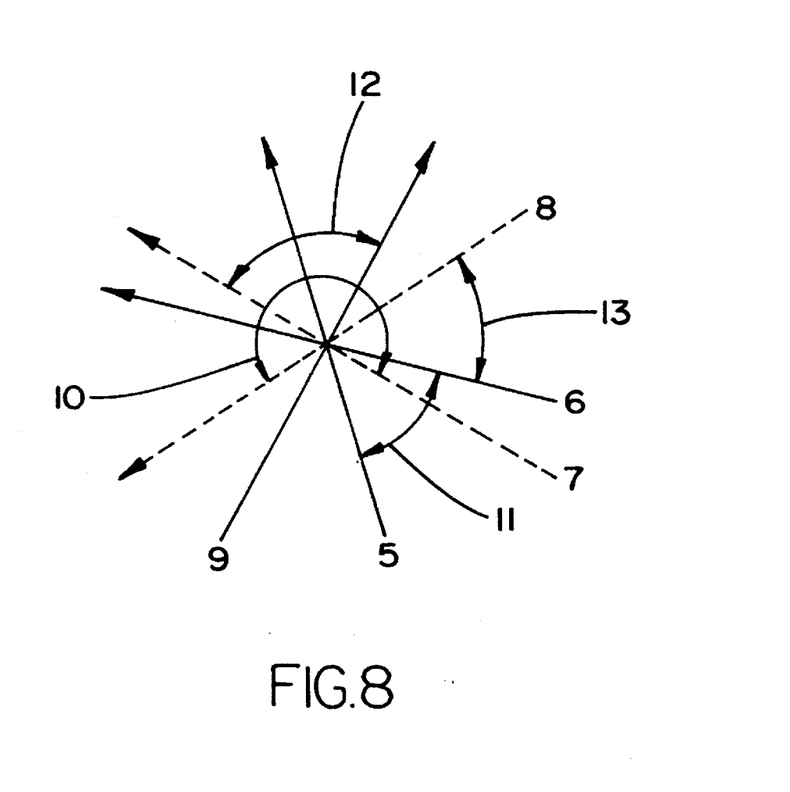

The phase plate thus obtained was laminated to the upper surface of an STN liquid crystal cell of 1/200 duty drive in accordance with the arrangement shown in FIG. 7, and further a polarizing plate was stuck thereon to obtain a reflection type cell. In this case, the upper/lower polarizing plate direction, upper/lower electrode base rubbing direction, and the molecular orientation direction of the nematic film (the phase film) are as shown in FIG. 8. More particularly, the twist angle of the liquid crystal molecule in the liquid crystal cell is 240° the angle between the axes of polarization of the upper and lower polarizing plates is 60°, the angle between the rubbing direction of the upper electrode base and the molecular orientation direction in the nematic film is 90°, the angle between the axis of polarization of the lower polarizing plate and the rubbing direction of the lower electrode plate is about 45°. The display color of this liquid crystal cell was almost completely a black-and-white display color.

Examples 3–11

60 mmol of terephthalic acid dichloride, 25 mmol of methylhydroquinone, 25 mmol of catechol, 10 mmol of 1.6-hexanediol and 30 ml of pyridine were dissolved in 250 ml of o-dichlorobenzene. The resulting solution was polymerized in a nitrogen gas stream at 70° C. for 3 hours. Then, the reaction solution was filtered, poured into methanol to precipitate the polymer, followed by filtration and drying under reduced pressure, to afford a polyester having the properties shown in Table 1, Yield 11.0 g.

Using the acid chloride process shown here and the melt polycondensation process shown in Example 1, there were prepared such various polyesters as shown in Table 1. Using these polyesters, there were prepared phase plates with a nematic structure immobilized each on a glass plate or a plastic film under the conditions shown in Table 2. Then, the phase plates were checked for color compensating effect in the same manner as in Example 2. As a result, a black-and-white display was obtained in all of them. Thus, the phase plates according to the present invention proved to exhibit the color compensating effect.

Example 12

Figure 9:
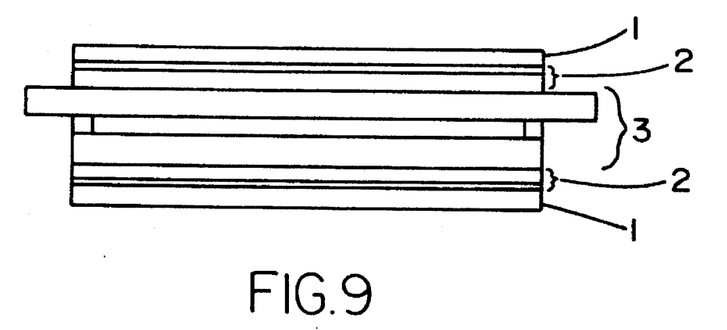
Figure 10:
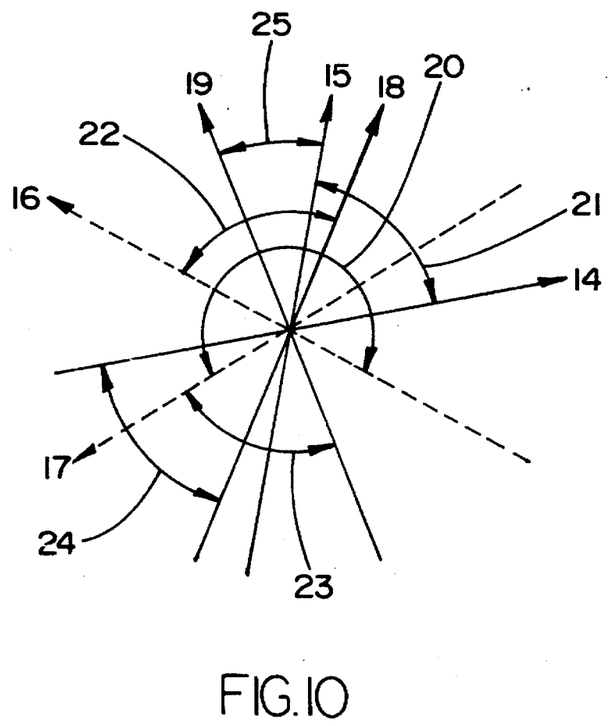

Using the polymer prepared in Example 3, two phase plates each having a retardation value of 0.35 μm were fabricated in the same way as in example 2. These two phase plates were laminated to the upper and lower surfaces, respectively, of an STN liquid crystal cell of 1/200 duty drive in accordance with the arrangement shown in FIG. 9 to obtain a transmission type cell. In this case, the direction of the upper and lower polarizing plates, the rubbing direction of the upper and lower electrode bases, and the molecular orientation direction of the two phase plates, were set as shown in FIG. 10. The angle between the polarization axes of the upper and lower polarizing plates is 70°, the angle between the rubbing direction of the upper electrode base and the molecular orientation direction in the upper phase film is 80°, the angle between the rubbing direction of the lower electrode base and the molecular orientation direction in the lower phase film is 100°, the angle between the polarization axis of the upper polarizing plate and the molecular orientation direction in the upper phase film is about 60°, and the angle between the polarization axis of the lower polarizing plate and molecular orientation direction of the lower phase film is about 30°. The display color of this transmission type liquid crystal cell was almost completely a black-and-white display color.

Comparative Example 1

60 mmol of terephthalic acid dichloride, 40 mmol of methylhydroquinone, 20 mmol of 1,6-hexanediol and 30 ml of pyridine were dissolved in 250 ml of o-dichlorobenzene and the resulting solution was polymerized in a nitrogen gas stream at 70° C. for 2.5 hours. The reaction solution was filtered, then poured into methanol to precipitate the polymer, followed by filtration and subsequent drying under reduced pressure to afford a polyester having the properties shown in Table 1. Using this polyester, there was prepared a 20 wt % solution in tetrachloroethane and the immobilization of orientation was tried in the same way as in Example 1. However, the resulting film was a whitely turbid film not having transparency. As a result of observation using a polarizing microscope, the film proved to have a disordered orientation in the greater part although there partially remained a nematic orientation. Thus, it could not be used as a phase film.

TABLE 2

| Example | Light Transmitting Base | Heat Treatment Conditions °C. × min | Birefringence X Film Thickness μm | Color Compensating Effect |
|---|---|---|---|---|
| 3 | Polyether sulfone film | 150 × 30 | 0.58 | ⊚* |
| 4 | Glass plate | 240 × 20 | 0.59 | ⊚ |
| 5 | Glass plate | 230 × 15 | 0.58 | ⊚ |
| 6 | Glass plate | 200 × 20 | 0.58 | ⊚ |
| 7 | Polyethylene terephthalate film | 140 × 5 | 0.59 | ⊚ |
| 8 | Glass plate | 180 × 5 | 0.58 | ⊚ |
| 9 | Glass plate | 200 × 1 | 0.58 | ⊚ |
| 10 | Glass plate | 120 × 3 | 0.57 | ⊚ |
| 11 | Glass plate | 180 × 10 | 0.58 | ⊚ |

*) ⊚; Almost complete black-and-white display was made

In FIGS. 7–10 in which the adhesive layers are omitted;
1 is an upper polarizing plate
2 is a phase plate
3 is a liquid crystal cell
4 is a lower polarizing plate
5 is the polarization axis direction of the lower polarization plate
6 is the polarization axis direction of the upper polarization plate
7 is the rubbing direction of the lower electrode plate
8 is the rubbing direction of the upper electrode plate
9 is the molecular orientation direction of the Phase film
10 is the twist angle and direction of the display liquid crystal
11 is the angle between 5 and 6
12 is the angle between 7 and 9
13 is the angle between 6 and 8
14 is an upper polarizing plate
15 is a lower polarizing plate
16 is the rubbing direction of the lower electrode plate
17 is the rubbing direction of the upper electrode plate
18 is the molecular orientation direction of the upper phase film

TABLE 1

| Example | Polymer Composition (mol %) | Inherent Viscosity | Glass Transition Point (°C.) | phase Series |
|---|---|---|---|---|
| 1 | TPA:MHQ:CT = 49:25:26 | 0.13 | 100 | I→N→g |
| 3 | TPA:MHQ:CT:1.6-HD = 49:21:21:9 | 0.17 | 94 | I→N→g |
| 4 | TPA:CHQ:CT:49:25:26 | 0.14 | 70 | I→N→g |
| 5 | TPA:NDA:MHQ:CT = 25:25:35:15 | 0.21 | 66 | I→N→g |
| 6 | BPDA:HQ:CCT = 49:34:17 | 0.15 | 82 | I→N→g |
| 7 | TPA:t-BHQ:CT = 49:25:26 | 0.09 | 100 | I→N→g |
| 8 | TPA:PA:MHQ:HQ = 24:25:27 | 0.18 | 70 | I→N→g |
| 9 | TPA:SA:MHQ:HQ = 38:34:25:13 | 0.11 | 108 | I→N→g |
| 10 | BPDA:t-BHQ:1.4-BD = 50:24:26 | 0.20 | 64 | I→N→g |
| 11 | TPA:MHQ:1.6-HD = 48:35:17 | 0.28 | 94 | I→N→g |
| Comparative Example 1 | TPA:MHQ:1.6-HD = 48:35:17 | 0.20 | 89*[1] | I→N→K |

TPA: terephthalic acid unit, NDCA: 2,6-naphthalenedicarboxylic acid unit.
BPDA: 4,4-biphenyldicarboxylic acid unit, PA: phthalic acid unit, SA: salicylic acid unit, MHQ: methylhydroquinone unit, CHQ: chlorohydroquinone unit, HQ: hydroquinone unit, t-BHQ: t-butylhydroquinone unit, CT: catechol unit, CCT: 3-chlorocatechol unit, 1,6-HD: 1,6-hexanediol unit, MBD: 2-methyl-1,4-butanediol unit, 1,4-BD: 1,4-butanediol unit
FBPDA: 2,2'-bistrifluoromethyl-4,4'-biphenyldicarboxylic acid unit, FTPA: trifluomethylterephthalic acid.
I: isotropic phase, N: nematic phase, g: glass phase, K: crystal phase
*[1] indicates a crystallization temperature, not a glass transition point.

19 is the molecular orientation direction of the lower phase film 20 is the twist angle and direction of the display liquid crystal
21 is the angle between 14 and 15
22 is the angle between 16 and 18
23 is the angle between 17 and 19
24 is the angle between 14 and 18
25 is the angle between 15 and 19

Example 13

Polyimide varnish PIQ (a product of Hitachi Kasei) was applied onto a glass base at a thickness of about 1000 Å and then calcined at 270° C. to form a polyimide film. Then, the upper surface of the polyimide film was rubbed in one direction by Tetoron implanted blanket.

Then, a solution (15 wt %) of a nematic liquid crystalline polyester-based liquid crystalline polymer having a repeating unit of the following formula (A) in tetrachloroethane was applied onto the alignment layer prepared above, by a spin coating method, then dried and therefter heat-treated for 10 minutes at 200° C. corresponding to the temperature of affording a nematic phase of (A), followed by rapid cooling to room temperature to obtain a phase plate. The thickness of the liquid crystalline polymer film was 2.4 μm. The orientation texture thus obtained was observed and proved to be a homogeneous orientation. The retardation was 0.55 μm at 550 nm.

The phase plate thus obtained was laminated as a compensator to an STN cell having a twist angle of 220° and a Δnd of 0.85 μm, then this laminate was vertically sandwiched in between polarizing plates to fabricate a liquid crystal display having the construction shown in FIG. 1. In the angular arrangement there were adopted $\delta=90°$ and $\alpha=\beta=45°$.

Figure 11:
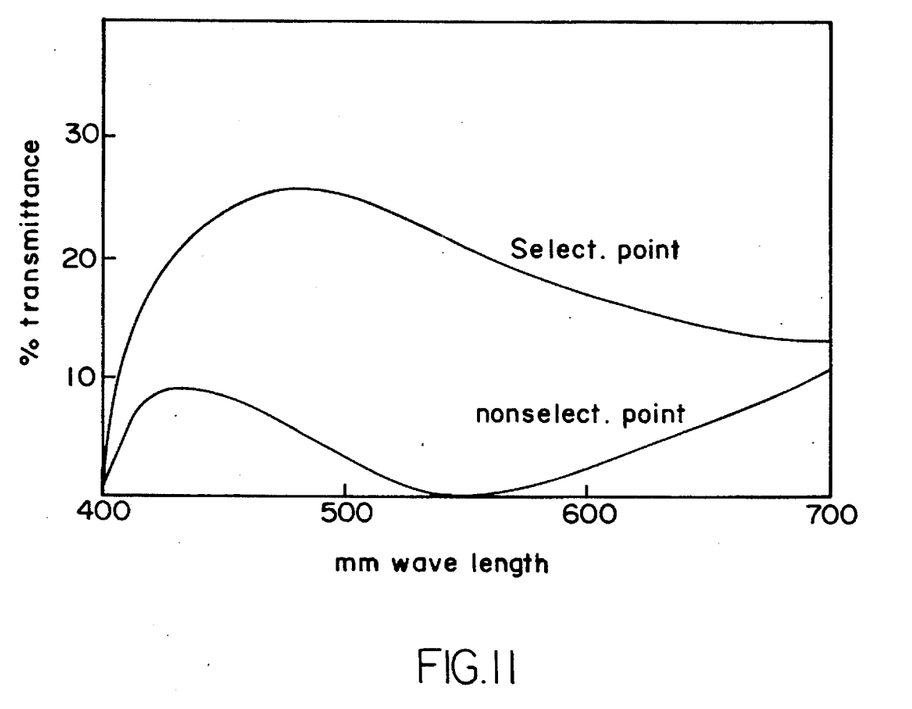
FIG. 11 is a diagram showing a wavelength dependence of the transmissivity of a liquid crystal display of Example 13.

This liquid crystal display was driven by a time division drive of duty as a result, there was attained a black-and-white display of 1/200 good contrast as shown in FIG. 11, and the field angle was wide and uniform. Thus, a superior display performance was exhibited.

Tg = 100° C.

Phase series: I ⟶ N ⟶ g
(Isotropic liquid) (Nematic) (Glass)

Example 14

A liquid crystal display was fabricated in the same way as in Example 13 except that as the liquid crystalline polymer there was used a liquid crystalline polymer having a repeating unit represented by the following formula (B). Like Example 13, there was attained a superior black-and-white display.

Tg = 100° C.

Phase series: I ⟶ N ⟶ g

Example 15

Using the liquid crystalline polymer (B), two phase plates each 0.35 μm in retardation were fabricated in the same manner as in Example 13. The phase plates thus obtained were laminated to an STN cell having a twist angle of 220° and a Δnd of 0.85 μm, then the resulting laminate was vertically sandwiched in between polarizing plates to fabricate a liquid crystal display having the construction shown in FIG. 4. In the angular arrangement there were adopted $\delta_1=80°$, $\delta_2=80°$, $\alpha=30°$, and $\beta=60°$.

This liquid crystal display was driven by a time division drive of ½ duty; as a result, like Example 13, there was attained a black-and-white display of good contrast, and the field angle was wide and uniform. Thus, a superior display performance was exhibited.

Comparative Example 2

A liquid crystal display was fabricated in the same way as in Example 13 except that as the liquid crystalline polymer there was used a liquid crystalline polymer having a repeating unit represented by the following formula (C). The orientation of the compensator used in this liquid crystal display was a multi-domain orientation, having a light scattering property. When this liquid crystal display was driven by a time division drive of 1/200 duty, the contrast was very low to an unpractical extent.

Comparative Example 3

A liquid crystal display was fabricated in the same way as in Example 13 except that as the compensator there was used a stretched polycarbonate film having $n_x=1.5883$, $n_y=1.5822$, $n_z=1.5795$ and a retardation of 0.55 μm. When this liquid crystal display was operated, there was obtained the same contrast as in Example 13 when viewed from the front, but a marked coloration was observed when viewed at an oblique angle.

-continued

Crystallization temperature    89° C.

Phase series    I⟶N⟶K (Crystal phase)

In the liquid crystal display of the present invention, as set forth above, since a homogeneously orientated liquid crystalline polymer which exhibits nematic phase and glass phase is used as a compensator, there can be attained a wide field angle, uniform display, and high contrast. Moreover, a high reliability is obtained by using the liquid crystalline polymer after immobilization of its orientation. Further, by utilizing the self-holding property of the liquid crystalline polymer it is made possible to suppress the increase in thickness of the liquid crystal display. Thus, the liquid crystal display of the present invention has such superior features and is of a great value as a display in various information devices.

What is claimed is:

1. A liquid crystal display comprising:
   a liquid crystal cell including a pair of bases having electrodes and a liquid crystal layer sandwiched in between said bases and having a positive dielectric anisotropy, said liquid crystal layer being twist-oriented substantially horizontally in the absence of voltage and with a spiral axis facing perpendicularly to the bases;
   polarizers disposed outside said bases; and
   a compensator disposed between said liquid crystal cell and one of said polarizers, said compensator containing as a main constituent a film of a homogeneously orientated liquid crystalline polymer which exhibits a nematic phase in the state of liquid crystal and assumes a glassy state at a temperature below the liquid crystal transition point of the polymer.

2. A liquid crystal display as set forth in claim 1, wherein said liquid crystalline polymer as a constituent of the compensator is in glass phase with the orientation of the nematic phase immobilized.

* * * * *